United States Patent Office 3,489,837
Patented Jan. 13, 1970

3,489,837
SYNERGISTIC ANTISEPTIC COMPOSITION CONSISTING OF 9-AMINOACRIDINE HYDROCHLORIDE AND BENZETHONIUM CHLORIDE
LeRoy J. Hyman, Del-Jay Farm, Chagrin River Road, Gate Mills, Ohio 44040
No Drawing. Continuation-in-part of application Ser. No. 578,499, Sept. 12, 1966. This application July 11, 1968, Ser. No. 743,944
The portion of the term of the patent subsequent to Aug. 27, 1985, has been disclaimed
Int. Cl. A61l 23/00; A61k 27/00
U.S. Cl. 424—257     1 Claim

ABSTRACT OF THE DISCLOSURE

This invention is concerned with an antiseptically synergistic combination of 9-aminoacridine hydrochloride and benzethonium chloride.

---

This application is a continuation-in-part application of my copending applications, Ser. Nos. 578,499 filed Sept. 12, 1966, now Patent 3,399,264; 589,534 filed Oct. 26, 1966, now abandoned; and 649,739 filed June 28, 1967, now abandoned; all three of which were continuation-in-part applications of Ser. No. 481,903 filed Aug. 23, 1965, now abandoned.

Applicant hereby disclaims any term of a patent issuing from the present application that extends beyond the expiration of said Patent 3,399,264.

This application relates to new and useful improvements in an antibacterial composition and more particularly seeks to provide a composition for, and method of, attaining a quick and effective skin or mucosa antisepsis from a prepared material without adding water or other similar agents thereto at the time of application.

It is known, of course, that surgeons or others to attain skin antisepsis with ordinary soaps, or detergents, require from five to ten minutes of vigorous scrubbing and copious amounts of water. Various materials are known that will produce quicker antisepsis of the skin or mucosa but generally cause irritation to sensitive skin or mucosa when used at a concentration sufficient to create antisepsis.

It is also known that 9-aminoacridine hydrochloride has anti-bacterial properties to effect antisepsis, as does di-isobutyl phenoxy ethoxy ethyl dimethyl benzyl ammonium chloride, better known as benzethonium chloride.

However, when each of these agents is used alone, in the concentration required to be sufficiently effective it has irritating effects upon the human skin that precludes its use as an antiseptic surgical scrub. If each is used in an extremely low concentration, wherein it is without irritating effect on the skin, it no longer has the power to effectively inhibit the growth of bacteria of the type with which we are here concerned.

The primary object of this invention is to provide a soapless (or detergentless), antibacterial composition requiring no added water or carrier by the user at the time of application.

An additional object is to provide a formulation that provides antisepsis on contact with the skin.

Another object is to provide an antibacterial composition that effectively combats *Escherichia coli*, and therefore can be used for pre-operative skin preparation.

A further object is to provide such an antibacterial composition that is non-toxic and non-irritating to the skin or mucosa.

I have discovered that when a composition is made containing 9-aminoacridine hydrochloride in combination with benzethonium chloride, an unexpected synergistic reaction occurs which provides much greater inhibition of the growth of *Escherichia coli* than expected, which thus permits use at low concentrations that are not irritating to the human skin.

It is obvious, of course, that the concentration of the two ingredients must be high enough to create skin antisepsis and low enough to avoid irritation of the skin (or mucosa for certain applications), the permissible range of which will vary from patient to patient and application to application. Thus, I have found that the 9-aminoacridine may range from 0.05 to 0.5%, preferably 0.1 to 0.25% and the benzethonium chloride from 0.02 to 2.5%, preferably 0.03 to 0.15%, by weight of the carrier, depending upon such variables as the carrier, particular applications, etc.

With the above and other objects and features in view, the nature of which will be more apparent, the invention will be more fully understood by reference to the accompanying detailed description and the appended claims.

Laboratory proof of the synergistic effect was demonstrated by streaking agar plates with *Escherichia coli* bacteria and then applying a given test solution to the bacterial streak. Results at 24 hour readings were as follows:

| Sample No. | 1 | 2 | 3 | 4 | 5 |
|---|---|---|---|---|---|
| 9-aminoacridine | 0.20% | 0.25% | | | 0.20% |
| Benzethonium chloride | | | 0.05% | 0.25% | 0.05% |
| Results | − | − | − | − | + |

−=Indicates no visual indication of bacterial growth inhibition.
+=Indicates no visual indication of bacterial growth.
%=Aqueous solutions by weight.

These results were duplicated with the same concentrations in water, alcohol and an ointment. Thus, the mixture of 9-aminoacridine hydrochloride and benzethonium chloride, each in a concentration when used alone insufficient to inhibit the growth of *Escherichia coli*, acts to effectively inhibit the growth of the *Escherichia coli* while at the same time exhibiting no irritating effect on the normal human skn, which is a totally unexpected and unpredictable result.

Most any carrier, compatible with the active ingredients may be used including liquids (water, alcohol—50 to 95% ethyl or isopropyl), ointments (petrolatum, polyhydritic alcohols from 400 to 20,000 molecular weight such as polyethylene glycols), powders (talc, urea), emulsions (with carboxypolymethylene, gum tragacanth, gum acacia) aerosols (aqueous dihydric alcohol base with a surfactant) and others.

Moreover, it will be obvious to add other active ingredients to the basic composition to inhibit resistant organisms such as the pseudomonas or to attain other desired properties of the final composition, such additions including hexachloraphene, phenoxetol, zinc omadine, chlorocresol, chlorohexidine among many others.

For skin antisepsis, a small amount of any one of the described antiseptic, compositions is poured, sprayed, or spread on the hands. Using the fingers, the material is then worked into all the crevices of the skin and under the finger nails until it vanishes, leaving the skin sterile and antiseptic. Even if a second application is thought necessary, the entire "scrub-up" period will take only a few minutes, with the additional advantage that skin antisepsis can be attained at locations away from the conventional "scrub-up" sink.

It will now be clear that there has been provided antiseptic compositions that will create skin antisepsis without the necessity of using a water rinse, and with no toxic reaction on the skin itself. Although this has been described for primarily human skin antisepsis, the compositions may be used for various other local antiseptic problems, such as veterinarian applications, vaginitis (for mucosal applications, concentrations are even more critical) and others.

What is claimed is:

1. An antiseptic composition consisting, essentially, of a mixture by weight of 0.20% 9-aminoacridine hydrochloride and 0.05% benzethonium chloride in a compatible carrier.

References Cited

Merck Index, 7th ed. (1960), p. 130.

ALBERT T. MEYERS, Primary Examiner

S. J. FRIEDMAN, Assistant Examiner

U.S. Cl. X.R.

424—359